March 22, 1932.  F. J. KELLY  1,850,326
ADJUSTABLE LAWN MOWER HANDLE
Filed March 11, 1931  2 Sheets-Sheet 2
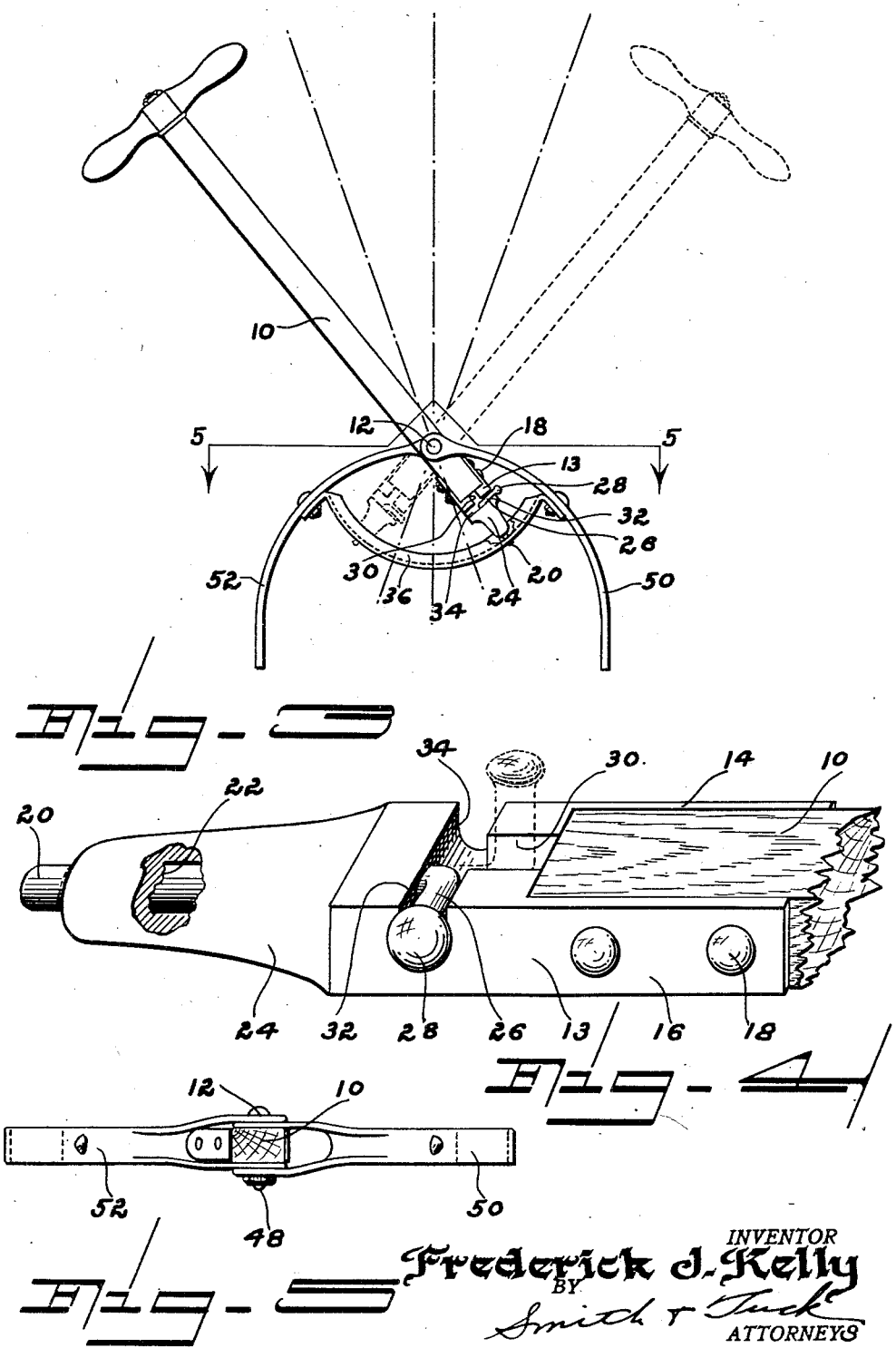

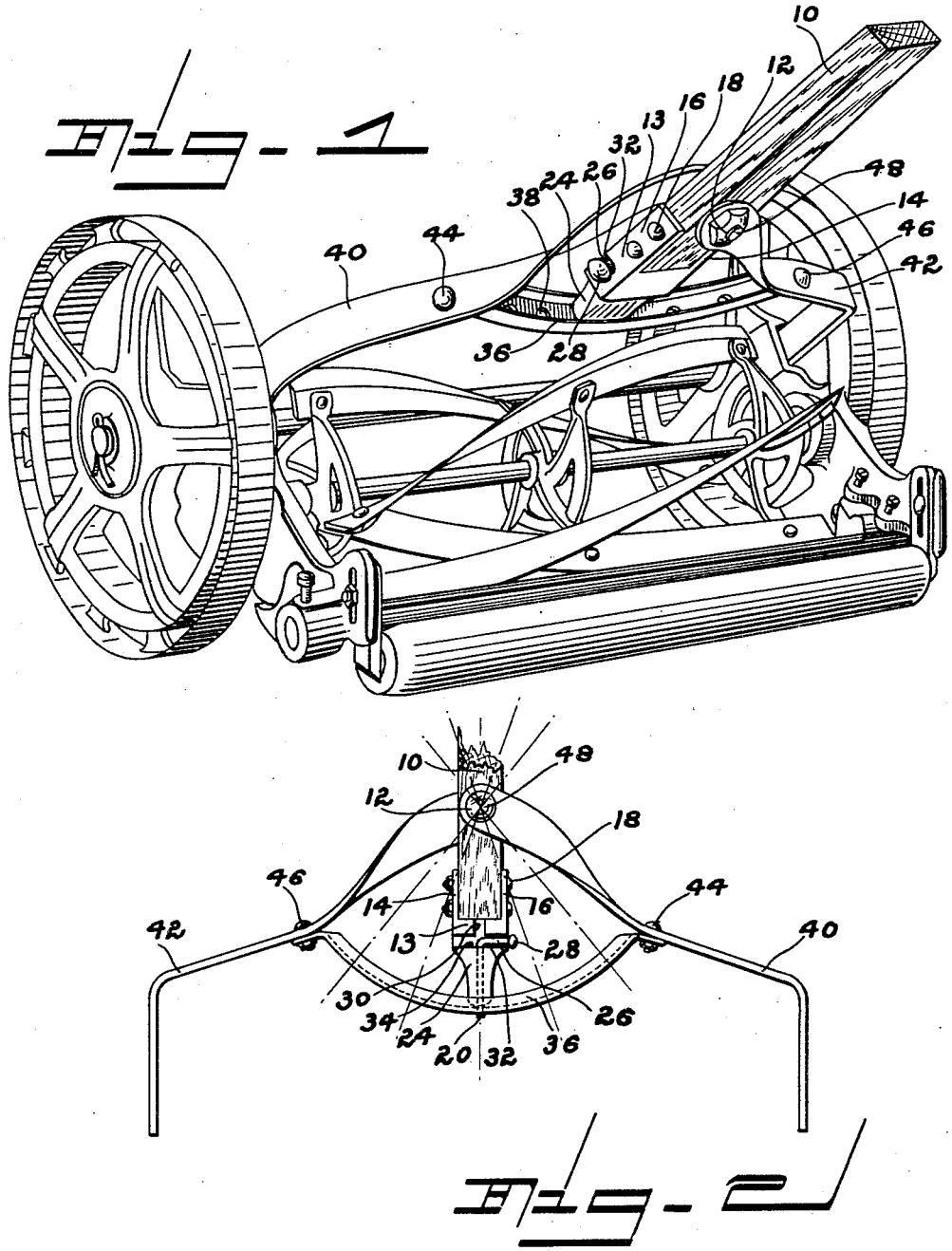

Patented Mar. 22, 1932

1,850,326

UNITED STATES PATENT OFFICE

FREDERICK J. KELLY, OF SEATTLE, WASHINGTON

ADJUSTABLE LAWN MOWER HANDLE

Application filed March 11, 1931. Serial No. 521,687.

My present invention relates to the art of lawn mowing equipment and more particularly to an adjustable handle for lawn mowers.

In the past considerable difficulty has been experienced in mowing steep slopes, particularly terraces, the reason being, naturally, that it is very difficult for one to walk up and down the steep slopes, and further for the reason that terraces should be cut by moving the lawn mower along to take swaths that are practically at the same elevation, as distinguished from going up and down the slope. With my present device it is possible for one mowing such a terrace to make one or two strips across the face of the terrace at either its bottom or top with the mower handle in its normal position.

With my handle it is not necessary to drag the lawn mower down or up the slope, backwards, and thus any danger of tearing up the grass or soil is avoided. Then I provide an easy means of changing the horizontal angle of the handle with respect to the mower so that additional cuts can be made. Therefore The principal object of my device is to provide means whereby the angular relationship between the mower handle and the axle of the mower can be varied.

A further object is to provide means of this character that can be easily attached to a lawn mower in place of its usual handle.

A still further object is the provision of means whereby the change of horizontal angle referred to can be made very quickly and easily.

Other and more specific objects will be apparent from the following description taken in connection with the accompanying drawings, wherein Figure 1 is a perspective view showing my device as installed on a standard lawn mower.

Figure 2 is the top plan view of one form of my device.

Figure 3 is a top plan view of a lawn mower and a modified form of adjusting means and showing diagrammatically the various positions the lawn mower handle might assume.

Figure 4 is a fragmentary perspective detail in enlarged size showing the locking bolt arrangement of my device.

Figure 5 is a sectional view taken along the line 5—5 of Figure 3.

Referring to the drawings throughout which like reference characters indicate like parts, numeral 10 designates a lawn mower handle of standard construction, which is provided with a pivot hole at 12, and is provided further at its extreme lower end with a locking bolt member 13 which is probably best illustrated in Figure 4. One end of said lock is bifurcated to form the side members 14 and 16 which are adapted to include the lower end of the handle 10 and may be attached thereto by bolts or rivets 18.

Substantially coaxial with handle 10 is a locking bolt 20 which is provided with a cylindrical portion which is adapted to reciprocate within the cylindrical bore 22 of member 24. At its upper end bolt 20 is provided with an upturned portion 26 and for ease of handling I provide further a ball-like enlargement at 28. This provides an easy means of operating bolt 20. When it is raised to a vertical position it may be slid up toward the handle within slot 30 so as to withdraw the tip of bolt 20 from engagement with its locking segment. When the bolt is pushed downwardly from the handle, however, and then rotated a quarter of a turn until it rests in either slot 32 or 34 it is of course impossible for the bolt to be forced upwardly. Coacting with bolt 20 I provide a segmental locking bar 36. This of course must be formed on a radius equal to slightly more than the distance from the lower end of member 24 to the point of rotation 12. I have found the most satisfactory form for this bar is that of a channel. This is probably best illustrated in Figure 1 and the web is provided with a plurality of locking openings 38.

I have provided in my drawings two different forms of securing my handle and locking segment in their proper positions. This may take the form of two metal straps as 40 and 42 which are adapted to engage the lawn mower in the usual manner and which are secured at 44 and 46 respectively to the locking segment 36 and are then bent through 90° and provide support for the pivot pin 48 which passes through the hole 12 in handle 10. It must be understood that the curvature of straps 40 and 42 at their upper end must be such that the lower end of handle 10 will be free to swing along the segmental locking bar 36. The other form of support that I have illustrated is shown best in Figures 3 and 5 and consists of two separate members as 50 and 52 which at their upper ends are bifurcated to provide a double interlocking pivot arrangement which provides a more secure fastening for bolt 48.

Method of operation

In operating my device when it is necessary to work on a slope that is beyond ordinary convenient reach, I adjust the position of handle 10 to one of the various positions shown in Figure 3. This is easily done by withdrawing bolt 20 from segment 36 and moving the handle to its new position. It is here that the channel is very desirable in that it holds and guides the end of member 24 so that it is not at all difficult to effect a new engagement of bolt 20 with the desired opening in segment 36. Now, I have found it most desirable to have the two half grooves 32 and 34 rather than just one of them, because I have found that it is quite desirable in a device subject to jarring, as is a lawn mower, to always have the bolt head 28 in that one of the two grooves which will be on the downhill side. In this way there is little danger of the bolt working loose.

The adjustable handle has been found to be a great convenience in cutting grass near the base of shrubbery as the mower can be driven past, near the base of the shrub without any danger of getting the hands into thorns or the like.

The foregoing description and the accompanying drawings are believed to clearly disclose a preferred embodiment of my invention, but it will be understood that this disclosure is merely illustrative and that such changes in the invention may be made as are fairly within the scope and spirit of the following claims.

What I claim is:

1. An adjustable handle for manually propelled tools consisting of a pivoted handle; metal support straps secured to the tool and adapted to co-act to provide a pivot support for said handle; a pivot pin adapted to pivotably secure said handle to said straps; a segmental locking bar fixedly secured to said straps, disposed beyond the extreme lower end of said handle, and provided with a plurality of locking openings; a locking member secured to the lower end of said handle; a locking bolt, disposed for limited reciprocation within said member, adapted to engage said locking openings; means adapted to receive said bolt and lock the same against longitudinal movement.

2. An adjustable handle for manually propelled lawn mower consisting of a pivoted handle; metal support straps secured to the tool and adapted to co-act to provide a pivot support for said handle; a pivot pin adapted to pivotably secure said handle to said straps; a segmental locking bar fixedly secured to said straps, disposed beyond the extreme lower end of said handle, and provided with a plurality of locking openings; a locking member secured to the lower end of said handle; a locking bolt, disposed for limited reciprocation within said member, adapted to engage said locking openings; locking means on said locking member adapted to receive said bolt and lock the same against longitudinal movement; and a slot co-axially disposed with said bolt and adapted to permit sufficient longitudinal travel of said bolt to permit its withdrawal from the locking opening.

3. An adjustable handle for manually propelled tools consisting of a pivoted handle; metal support straps secured to the tool and adapted to co-act to provide a pivot support for said handle; a pivot pin; a segmental locking bar fixedly secured to said straps and provided with a plurality of locking openings; a bifurcated locking member secured to the lower end of said handle; a locking bolt, disposed for limited reciprocation within said member, adapted to engage said locking openings and provided with an upturned handle; two co-axially positioned transverse slots in said locking member adapted to receive said upturned handle and lock the same against longitudinal movement; and a slot co-axially disposed with said bolt and adapted to permit sufficient longitudinal travel of said bolt to permit its withdrawal from the locking opening.

4. An adjustable handle for manually propelled tools consisting of a pivoted handle; metal support straps secured to the tool and adapted to provide a pivot support for said handle; a pivot pin adapted to pivotably secure said handle to said straps; a segmental locking channel bar fixedly secured to said straps disposed immediately beyond the extreme lower end of said handle, and provided with a plurality of locking openings; a bifurcated locking member secured to the lower end of said handle; a locking bolt, disposed for limited reciprocation within said member, adapted to engage said locking openings and provided with an upturned handle; two co-axially positioned transverse slots in said locking member adapted to receive said upturned handle and lock the same against longitudinal movement; and a slot co-axially disposed with said bolt and adapted to permit sufficient longitudinal travel of said bolt to permit its withdrawal from the locking opening.

In witness whereof, I hereunto subscribe my name this 2nd day of March, A. D. 1931.

FREDERICK J. KELLY.